United States Patent
Jeon et al.

(10) Patent No.: US 9,937,866 B2
(45) Date of Patent: Apr. 10, 2018

(54) STRUCTURE OF DAMPER FOR GLOVE BOX

(71) Applicants: HYUNDAI MOBIS CO., LTD., Seoul (KR); NIFCO KOREA INC., Asan-si, Chungcheongnam-do (KR)

(72) Inventors: Duk Chul Jeon, Yongin-si (KR); Heung Hwan Lim, Asan-si (KR)

(73) Assignees: HYUNDAI MOBIS CO., LTD., Seoul (KR); NIFCO KOREA INC., Asan-si (KR)

(*) Notice: Subject to any disclaimer, the term of this patent is extended or adjusted under 35 U.S.C. 154(b) by 330 days.

(21) Appl. No.: 14/752,525

(22) Filed: Jun. 26, 2015

(65) Prior Publication Data
US 2016/0069412 A1    Mar. 10, 2016

(30) Foreign Application Priority Data
Sep. 4, 2014   (KR) .................. 10-2014-0117417

(51) Int. Cl.
| F16H 9/10 | (2006.01) |
| F16H 55/17 | (2006.01) |
| F16H 55/26 | (2006.01) |
| B60R 7/06 | (2006.01) |

(52) U.S. Cl.
CPC ..................................... B60R 7/06 (2013.01)

(58) Field of Classification Search
CPC ........................................................ B60R 7/06
See application file for complete search history.

(56) References Cited

U.S. PATENT DOCUMENTS

| 5,862,896 A * | 1/1999 | Villbrandt ............... B60R 7/06 16/49 |
| 8,505,996 B1 * | 8/2013 | Shin ........................ B60R 7/06 296/37.12 |
| 2009/0115115 A1 * | 5/2009 | Zeilenga ................ E05F 5/00 267/69 |
| 2011/0014993 A1 | 1/2011 | Cameron |
| 2016/0137137 A1 * | 5/2016 | Shibata .................. B60R 7/06 296/37.12 |

FOREIGN PATENT DOCUMENTS

| CN | 101258299 A | 9/2008 |
| CN | 102112777 A | 6/2011 |
| CN | 102317125 A | 1/2012 |
| EP | 1659248 A1 | 5/2006 |

OTHER PUBLICATIONS

Office Action dated Oct. 25, 2016 of corresponding Chinese Patent Application No. 201510547542.5—6 pages.

* cited by examiner

*Primary Examiner* — Terence Boes
(74) *Attorney, Agent, or Firm* — Knobbe Martens Olson & Bear LLP

(57) ABSTRACT

A structure of a damper for a glove box includes: a rod which has a guide provided on an upper portion thereof, and a rack gear provided along one side thereof; a housing which has a guide groove that is correspondingly coupled to the guide; a damper which is installed on the housing; a slot hole which is provided at one end of the housing and to which a rotating shaft provided on the damper is correspondingly and movably coupled; and a pinion gear which is provided at an end of the rotating shaft and engages with the rack gear.

8 Claims, 5 Drawing Sheets

STRUCTURE OF DAMPER FOR GLOVE BOX

CROSS-REFERENCE TO RELATED APPLICATIONS

This application claims priority to and the benefit of Korean Patent Application No. 10-2014-0117417 filed in the Korean Intellectual Property Office on Sep. 4, 2014, the entire contents of which are incorporated herein by reference.

TECHNICAL FIELD

The present disclosure relates to a structure of a damper for a glove box.

BACKGROUND ART

In general, a glove box provides an accommodating space that is positioned at a height roughly corresponding to height of a knee of a person seated in a front passenger seat. In order to prevent the glove box from being rapidly dropped by its own weight when the glove box is opened, a device such as an air damper is used to slowly open the glove box. The air damper generates negative pressure by using a pressure difference of air, and applies force in a direction opposite to a direction of a load of the glove box to allow the glove box to be slowly opened.

SUMMARY

One aspect of the present invention provides a structure of a damper for a glove box, which is capable of preventing a damping function from deteriorating when items having predetermined weights or more are accommodated in the glove box, and preventing the glove box from being opened in two stages when the glove box is initially opened.

An embodiment of the present invention provides a structure of a damper for a glove box, including: a housing which is coupled to a rod; a damper which is rotatably coupled to one side of the housing so as to be positioned outside the housing and has a gear that is provided along an edge of an inner surface of the damper; a slot hole which is provided in a portion of the housing to which the damper is coupled, is correspondingly coupled to a rotating shaft provided on the damper, and provides a space in which the rotating shaft is movable; and a pinion gear which is coupled to an end of the rotating shaft coupled to the slot hole so as to be positioned inside the housing, and engages with a rack gear that is provided along a side of the rod.

The damper may be an oil damper.

A rib may be provided on the housing.

The rib may be provided at one end at a side of the housing so as to be positioned at a side of the damper at a rod end side.

When the glove box is opened, the rotating shaft may be moved to one end of the slot hole, the damper may be moved in a direction toward the rib, and a gear tooth of the damper gear may be caught by the rib, such that the damper gear and the rib are engaged.

When the glove box is closed and the rotating shaft is moved to the other end of the slot hole, the damper may be moved away from the rib, and the damper gear and the rib may be disengaged.

The rod end may be connected to the glove box.

The slot hole may be a hole that is longer in a left and right direction than a diameter of the rotating shaft so as to provide a sufficient space in which the rotating shaft is movable in the left and right direction.

A guide may be provided at an upper end of the rod, and a guide groove, which is correspondingly coupled to the guide, may be provided inside an upper portion of the housing while corresponding to the guide.

A lower end of the housing may be connected with the glove box.

The structure of the damper for a glove box according to the embodiment of the present invention may prevent a damping function from deteriorating when items having predetermined weights or more are accommodated in the glove box, and may prevent the glove box from being opened in two stages when the glove box is initially opened.

The opening properties of the glove box are improved, thereby ensuring functional quality.

Marketable competitiveness against other types of vehicles in global markets may be ensured by increasing cost competitiveness.

Since resistance force is not generated when the glove box is closed, convenience in using the glove box may be expected.

Since a sufficient length of the rod may be ensured, there is no restriction on position of the oil damper, and as a result, a degree of design freedom when setting a peripheral layout such as an assembly position is high.

Since the damper is rectilinearly moved without being rotated, the damper may be commonly used.

Since there is no change in position of connecting portions of the pinion gear, the same performance can be ensured.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
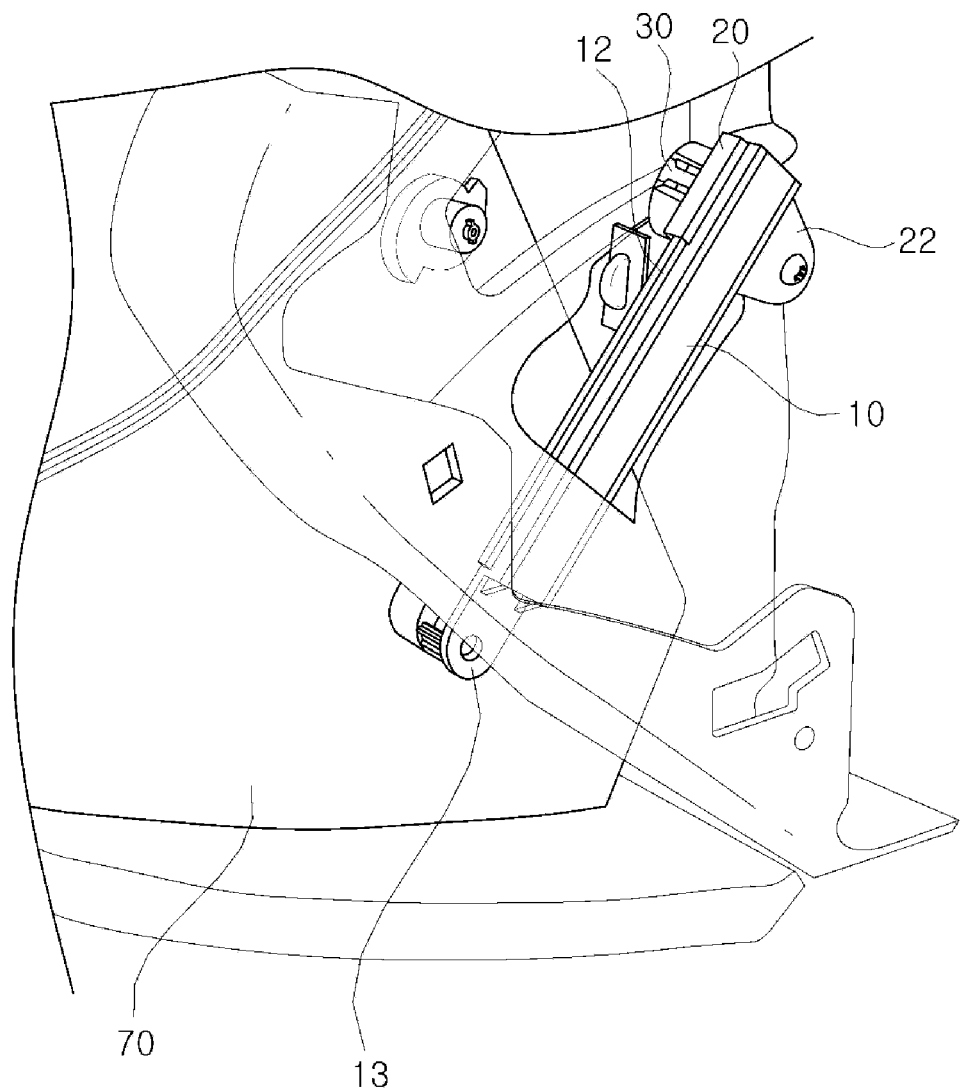
FIG. 1 is a view illustrating a state in which a damper for a glove box according to an embodiment of the present invention is installed.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and

DETAILED DESCRIPTION

Hereinafter, an embodiment of the present invention will be described in detail with reference to the accompanying drawings. First, in denoting reference numerals to constituent elements of respective drawings, it should be noted that the same constituent elements will be designated by the same reference numerals even though they are shown in different drawings. Further, hereinafter, an embodiment of the present invention will be described, but it is obvious that the technical spirit of the present invention is not restricted or limited thereto, but the embodiment of the present invention may be modified by a person with ordinary skill in the art and may be variously carried out.

When using an air damper, the force cannot be generated until the negative pressure is generated by the pressure difference, and as a result, the function of the air damper cannot be performed. There is a difference in operations of the glove box before and after the force of the air damper is generated, and as a result, the glove box is opened in two stages, which causes deterioration in functional quality. An air damper, which generates small force, may be used to address the foregoings, but in this case, when items, which exceed an accommodating condition, are accommodated in the glove box, the glove box is opened while being rapidly moved downward.

In order to address some issues of the air damper, an oil damper, which uses viscosity of oil, may be used. However, in the case of a general oil damper, resistance force is generated by viscosity when the oil damper is rotated in both directions. That is, resistance force of the oil damper is generated not only when the glove box is opened but also when the force is applied to close the glove box, which causes deterioration in functional quality.

According to a structure of a damper for a glove box according to an embodiment of the present invention, when a glove box 70 is opened, a damper gear 31 and a rib 60 of a housing 20 are engaged to generate resistance force by viscosity of a damper 30, and when the glove box 70 is closed, the damper gear 31 moves away from the rib 60 of the housing 20, and the damper gear 31 and the rib 60 are disengaged to induce free rotation of the damper 30, thereby preventing resistance force from being generated.

First, a configuration of the structure of the damper for a glove box according to the embodiment of the present invention will be described.

FIG. 1 is a view illustrating a state in which the damper for a glove box according to the embodiment of the present invention is installed. As illustrated in FIG. 1, the structure of the damper for a glove box according to the embodiment of the present invention includes a rod 10 which is provided with a rack gear 11, the housing 20 which is coupled to the rod 10, a slot hole 40 which is provided in the housing 20 and to which a rotating shaft 32 provided on the damper 30 is coupled, a pinion gear 50 which is coupled to an end of the rotating shaft 32 and engages with the rack gear 11 of the rod 10, and the rib 60 which is provided on the housing 20.

Figure 2:
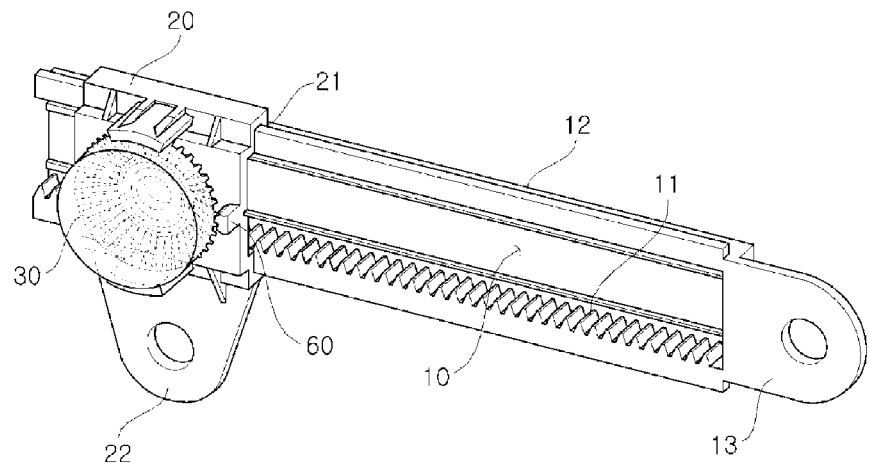
FIG. 2 is a view illustrating a structure of the damper for a glove box according to the embodiment of the present invention.

FIG. 2 is an enlarged view of the structure of the damper for a glove box according to the embodiment of the present invention. Referring to FIG. 2, the rod 10 has a guide 12 that matches with a guide groove 21 of the housing 20 along an upper end of the rod 10. A rod end 13 is connected to a side surface of the glove box 70. The rack gear 11 is provided along a side of the rod 10. The rack gear 11 engages with the pinion gear 50 that is coupled to the end of the rotating shaft 32 of the damper 30.

The housing 20 is coupled to the rod 10. The guide groove 21, which matches with the guide 12 of the rod 10, is provided at an upper end at one side of the housing 20. A lower end 22 of the housing is connected to the glove box 70. The rib 60 is provided at an edge of an outer surface of the housing 20. The rib 60 is formed at a side edge of the housing 20 at the rod end 13 side where the damper 30 is coupled. When the glove box 70 is opened, the damper gear 31 moves toward the rib 60, and a gear tooth of the damper gear 31 engages with the rib 60.

The damper 30 may be an oil damper. The oil damper is a device that absorbs energy by using viscous resistance of oil. The damper gear 31 is provided along an edge of an inner surface of the damper 30 which is directed toward the housing 20. The damper gear 31 may be a bevel gear. A gear tooth of the damper 30 engages with the rib 60 when the glove box 70 is opened. The damper 30 moves away from the rib 60 when the glove box 70 is closed. The rotating shaft 32 is provided at a center of the damper 30. One end of the rotating shaft 32 is coupled to a center of the inside of the damper 30 in which damping force is generated, and the rotating shaft 32 transmits rotation, which is generated by damping force generated in the damper 30, to the pinion gear 50.

The rotating shaft 32 is inserted into and coupled to the slot hole 40 provided in a portion of the housing 20 to which the damper 30 is coupled. The damper 30 may have a cylindrical shape. Of course, the interior of the damper 30 is filled with oil so that damping force may be generated. Because it is an already known fact that the damper 30 generates resistance force by using oil viscosity, a detailed description regarding an internal structure of the damper 30 in which damping force is generated will be omitted from the embodiment of the present invention.

Figure 3:
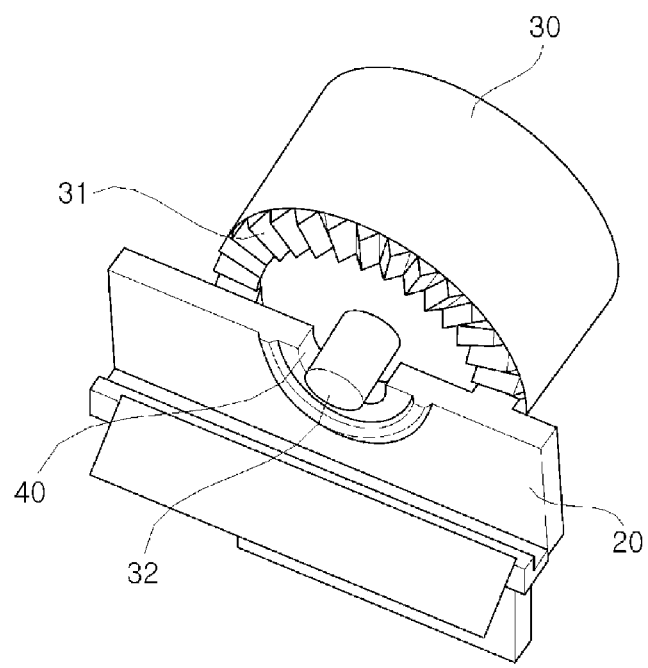
FIG. 3 is a view illustrating a state in which an oil damper and a slot hole according to the embodiment of the present invention are coupled.
Figure 4:
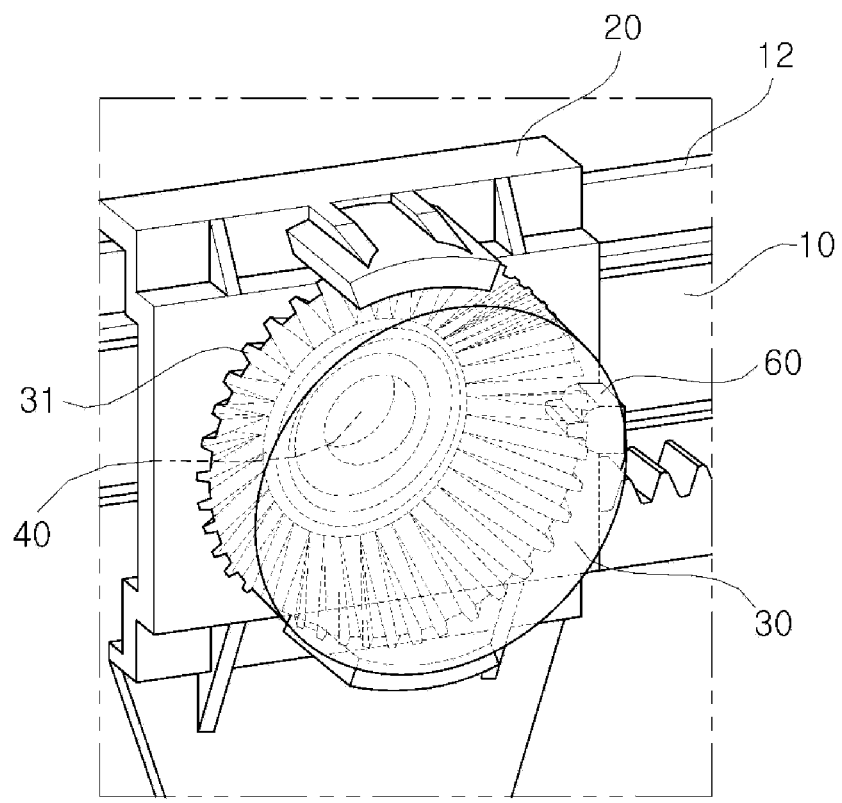
FIG. 4 is a view illustrating a state in which a housing and the oil damper according to the embodiment of the present invention are coupled.

FIG. 3 is a view illustrating a state in which the oil damper and the slot hole according to the embodiment of the present invention are coupled, and FIG. 4 is a view illustrating a state in which the housing and the oil damper according to the embodiment of the present invention are coupled. Referring to FIGS. 3 and 4, the slot hole 40 is formed in a portion of the housing 20 to which the damper 30 is coupled. The slot hole 40 needs to be formed to provide a sufficient space in which the rotating shaft 32 is movable in a left and right direction. To this end, the slot hole 40 is formed in a hole shape that is longer in the left and right direction than a diameter of the rotating shaft 32.

Next, an operation when the glove box according to the embodiment of the present invention is opened will be described.

Figure 5:
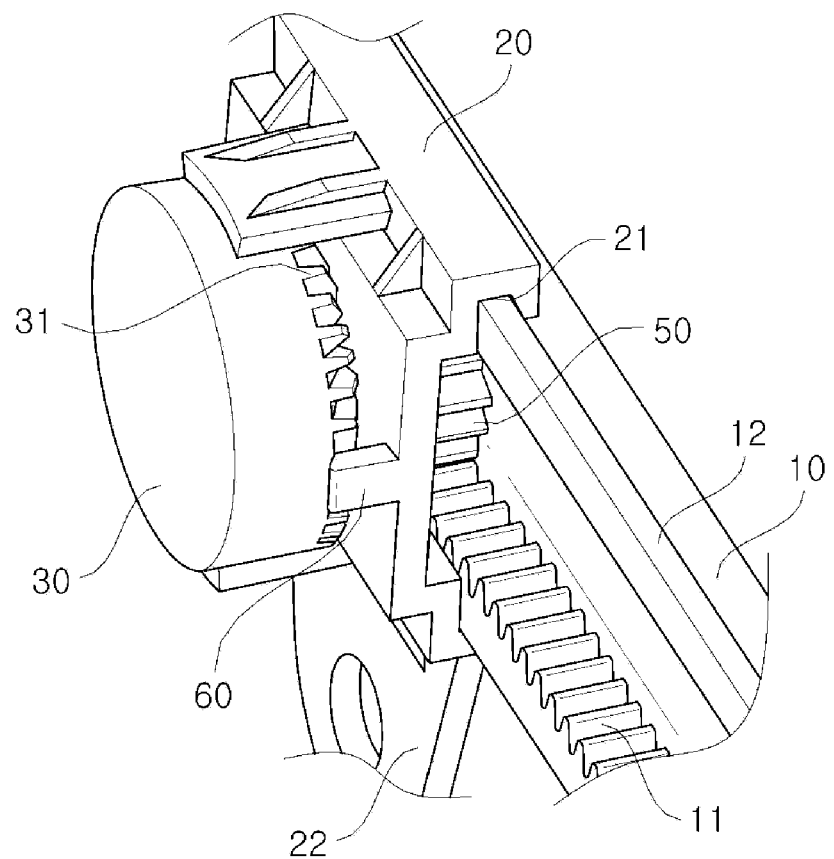
FIG. 5 is a view illustrating an operating state when the glove box according to the embodiment of the present invention is opened.

FIG. 5 is a view illustrating an operating state when the glove box according to the embodiment of the present invention is opened. As illustrated in FIG. 5, at the moment when the glove box 70 is opened, the housing 20 moves the rod 10, and in this case, the rotating shaft 32 is moved toward one end of the slot hole 40 at the rib 60 side. As the rotating shaft 32 is moved, the entire damper 30 is moved toward the rib 60, and the gear tooth of the damper gear 31 engages with the rib 60. In this state, the damper 30 cannot be rotated.

Here, the rotation of the entire damper 30 is stopped, and damping force is generated in the damper 30 by viscous resistance of oil. As the damping force is generated, the rotating shaft 32 of the damper 30 is slowly rotated, and rotational force of the rotating shaft 32 is transmitted to the pinion gear 50 connected with the rotating shaft 32.

In conjunction with the rotation of the pinion gear 50, the rack gear 11, which engages with the pinion gear 50, is rectilinearly moved, and the rod 10 is pushed in a direction in which the glove box 70 is opened. Further, the rod end 13, which is connected with the side surface of the glove box 70, slowly pushes the side surface of the glove box 70 in a direction in which the glove box 70 is opened, and as a result, the glove box 70 is slowly opened instead of being rapidly opened. Meanwhile, because damping force of the damper 30 acts in proportion to weights of items accommodated in the glove box 70, the greater the weights of items accommodated in the glove box 70, the greater the damping force generated in the damper 30.

As described above, according to the structure of the damper for a glove box according to the embodiment of the present invention, when the glove box 70 is opened, the damper gear 31 and the rib 60 of the housing 20 are engaged, and at the same time, resistance force caused by the viscosity is generated in the damper 30, such that the glove box 70 may be opened at a predetermined speed instead of being opened in two stages.

Next, an operation when the glove box according to the embodiment of the present invention is closed will be described.

Figure 6:
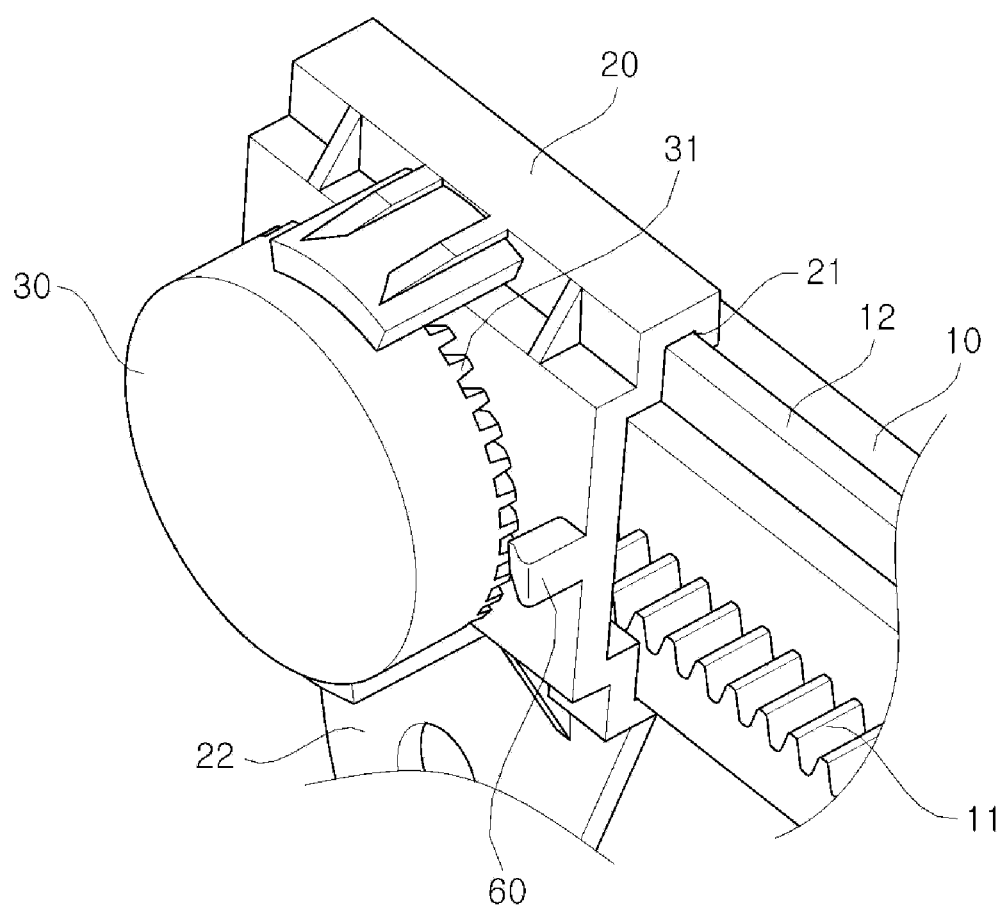
FIG. 6 is a view illustrating an operating state when the glove box according to the embodiment of the present invention is closed.

FIG. 6 is a view illustrating an operating state when the glove box according to the embodiment of the present invention is closed. As illustrated in FIG. 6, at the moment when the glove box 70 is closed, the housing 20 moves the rod 10, and in this case, the rotating shaft 32 is moved toward the other end of the slot hole 40 opposite to the rib 60.

As the rotating shaft 32 is moved as described above, the entire damper 30 is moved away from the rib 60, and the damper gear 31 and the rib 60 are disengaged. As the damper gear 31 and the rib 60 are disengaged, the entire damper 30 and the pinion gear 50 coupled to the rotating shaft 32 of the damper 30 may be freely rotated. In a state in which the damper gear 31 and the rib 60 are disengaged, the entire damper 30 and the pinion gear 50 may be freely rotated, but damping force of the damper 30 is not generated.

As the entire damper 30 and the pinion gear 50 are freely rotated at the same time, the rack gear 11 engaging with the pinion gear 50 is rectilinearly moved, and as a result, the entire rod 10 is pushed in a direction in which the glove box 70 is closed, such that the glove box 70 is closed.

As described above, according to the structure of the damper for a glove box according to the embodiment of the present invention, when the glove box 70 is closed, the damper gear 31 and the rib 60 of the housing 20 are disengaged, and at the same time, resistance force caused by the viscosity is not generated in the damper 30, such that a user may easily close the glove box 70.

As described above, the structure of the damper for a glove box according to the embodiment of the present invention may prevent a damping function from deteriorating when items having predetermined weights or more are accommodated in the glove box, and may prevent the glove box from being opened in two stages when the glove box is initially opened.

The opening properties of the glove box are improved, thereby ensuring functional quality, and ensuring marketable competitiveness against other types of vehicles in global markets by increasing cost competitiveness.

Since resistance force is not generated when the glove box is closed, convenience in using the glove box may be expected, and since a sufficient length of the rod may be ensured, there is no restriction on position of the oil damper, and as a result, a degree of design freedom when setting a peripheral layout such as an assembly position is high.

Since the damper is rectilinearly moved without being rotated, the damper may be commonly used, and since there is no change in position of connecting portions of the pinion gear, the same performance can be ensured.

As described above, the embodiments have been described and illustrated in the drawings and the specification. The embodiments were chosen and described in order to explain certain principles of the invention and their practical application, to thereby enable others skilled in the art to make and utilize various embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A structure of a damper for a glove box, comprising:
a guide rod extending in a longitudinal direction;
a housing coupled to the guide rod and configured to move with respect to the guide rod along the longitudinal direction, the housing comprising a housing plate that comprises a slot hole;
a damper device rotatably coupled to the housing and configured to rotate about a rotational axis with respect to the housing, the damper device comprising a side surface facing the housing plate;
a shaft extending from the damper device along a transverse direction to pass through the slot hole, the shaft being configured to rotate about the rotational axis within the slot hole and further configured to move along the longitudinal direction within the slot hole;
a rack gear fixed to the guide rod and extending along the longitudinal direction; and
a pinion gear fixed to the shaft and engaged with the rack gear, the pinion gear being configured to rotate about the rotational axis and moving along the longitudinal direction when the pinion gear rotates,
wherein the housing comprises a rib protruding from the housing plate in the transverse direction, wherein the damper device comprises gear teeth formed on the side surface of the damper device and protruding toward the housing plate, wherein the rib is configured to engage with the gear teeth when the shaft moves along the longitudinal direction within the slot hole.

2. The structure of the damper of claim 1, wherein the damper device comprises an oil damper.

3. The structure of the damper of claim 1, wherein when the glove box is opened, the shaft is configured to move to one end of the slot hole and the damper device is configured to move toward the rib such that the gear teeth and the rib are engaged.

4. The structure of the damper of claim 1, wherein when the glove box is closed, the shaft is configured to move to the other end of the slot hole and the damper device is configured to move away from the rib such that the gear teeth and the rib are disengaged.

5. The structure of the damper of claim 1, wherein the guide rod comprises one end connected to the glove box.

6. The structure of the damper of claim 1, wherein the slot hole has a length that is longer in a movement direction of the shaft than a diameter of the shaft.

7. The structure of the damper of claim 1, wherein a guide is provided at an upper end of the guide rod, and a guide groove, which is correspondingly coupled to the guide, is provided inside an upper portion of the housing while corresponding to the guide.

8. The structure of the damper of claim 1, wherein the housing comprises a lower end connected with the glove box.

* * * * *